(12) United States Patent
Denby et al.

(10) Patent No.: US 7,408,885 B2
(45) Date of Patent: Aug. 5, 2008

(54) METHOD AND APPARATUS FOR AUTOMATIC DETERMINATION OF PERFORMANCE PROBLEM LOCATIONS IN A NETWORK

(75) Inventors: Lorraine Denby, Berkeley Heights, NJ (US); Bengi Karacali, Basking Ridge, NJ (US); Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 878 days.

(21) Appl. No.: 10/643,275

(22) Filed: Aug. 19, 2003

(65) Prior Publication Data

US 2005/0053009 A1  Mar. 10, 2005

(51) Int. Cl.
*H04L 12/26* (2006.01)
(52) U.S. Cl. ...................................... 370/252; 370/231
(58) Field of Classification Search ................. 370/230, 370/231, 232, 233, 234, 235, 236, 251, 252; 709/224
See application file for complete search history.

(56) References Cited

U.S. PATENT DOCUMENTS

| | | | | |
|---|---|---|---|---|
| 5,197,127 A * | 3/1993 | Waclawsky et al. | ......... | 709/224 |
| 5,825,772 A * | 10/1998 | Dobbins et al. | ............. | 370/396 |
| 6,061,328 A * | 5/2000 | Read et al. | ................... | 370/216 |
| 6,748,429 B1 * | 6/2004 | Talluri et al. | ................ | 709/221 |
| 6,785,240 B1 * | 8/2004 | Cao et al. | .................... | 370/238 |
| 6,873,600 B1 * | 3/2005 | Duffield et al. | ............. | 370/252 |
| 7,159,026 B2 * | 1/2007 | Lau et al. | ..................... | 709/226 |
| 7,173,910 B2 * | 2/2007 | Goodman | .................... | 370/252 |
| 2003/0039212 A1 * | 2/2003 | Lloyd et al. | .................. | 370/235 |
| 2003/0053455 A1 * | 3/2003 | Kryskow, Jr. | ................ | 370/389 |
| 2003/0072485 A1 * | 4/2003 | Guerin et al. | ................ | 382/166 |
| 2003/0086425 A1 | 5/2003 | Bearden et al. | | |
| 2003/0091165 A1 | 5/2003 | Bearden et al. | | |
| 2003/0097438 A1 | 5/2003 | Bearden et al. | | |
| 2003/0202469 A1 * | 10/2003 | Cain | .......................... | 370/230 |
| 2004/0141527 A1 * | 7/2004 | Bennett et al. | .............. | 370/503 |

OTHER PUBLICATIONS

U.S. Appl. No. 10/261,431, filed Sep. 30, 2002, Bearden et al.
U.S. Appl. No. 10/459,948, filed Jun. 12, 2003, Adhikari et al.
U.S. Appl. No. 10/460,700, filed Jun. 12, 2003, Adhikari et al.

(Continued)

*Primary Examiner*—Chi H. Pham
*Assistant Examiner*—Kevin Mew
(74) *Attorney, Agent, or Firm*—Ryan, Mason & Lewis, LLP

(57) ABSTRACT

A network monitoring and analysis system is configured to include a root cause analysis function that permits the automatic determination of performance problem locations in a network of a communication system comprising a plurality of endpoint devices. Test communications are generated in the system in accordance with a selected pattern, which may be based on a flow matrix, and end-to-end path measurement data is collected utilizing the generated test communications. The end-to-end path measurement data is transformed to produce a plurality of performance indicators comprising a performance indicator for each of a plurality of non-end-to-end paths defined at least in part by the selected pattern.

19 Claims, 9 Drawing Sheets

OTHER PUBLICATIONS

Y. Breitbart et al., "Topology Discovery in Heterogeneous IP Networks," Proceedings of IEEE Infocom 2000, 10 pages, Mar. 2000.

B. Huffaker et al., "Topology Discovery by Active Probing," CAIDA, 8 pages, 2002.

M.R. Meiss et al., "Standards-Based Discovery of Switched Ethernet Topology," Advanced Network Management Lab, pp. 1-20, Apr. 2002.

R. Siamwalla et al., "Discovering Internet Topology," Cornell University, pp. 1-16, Jul. 1998.

J.Q. Walker, "A Handbook for Successful VoIP Deployment: Network Testing, QoS, and More," NetIQ Corporation, pp. 1-13, 2002.

"NetIQ Vivinet Diagnostics," http://www.netiq.com/products/vd/default.asp, pp. 1-2, 1993-2003.

"NetIQ—Checklist of VoIP Network Design Tips," NetIQ Corportion, 3 pages, 2002.

Brix Networks, "Library," http://www.brixnet.com/library/library_register.cfm, 1 page, 2003.

Brix Networks, "The Brix System," http://www.brixnet.com/products/products_overview.html, 1 page, 2003.

"Omegon Unveils NetAlly Solution; Industry-First Fully Active Service Quality Assurance Platform Assures Customers Unprecedented Levels of Network Availability and Reliability," http://www.itsecurity.com/tecsnews/sep2000/sep517.htm, pp. 1-3, Sep. 2000.

"Chariot VoIP Assessor Version 1.0," http://www.tmcnet.com/it/0302/0302labs5.htm, pp. 1-4, Mar. 2002.

"VoIP Management and Network Testing," http://www.netiq.com/solutions/voip/default.asp, pp. 1-3, 2002.

"Chariot," http://www.netiq.com/products/chr/, pp. 1-2, 2002.

"VoIP Test Module for Chariot," http://ww.netiq.com/products/chr/voipmodule.asp, pp. 1-2, 2002.

Telchemy, Inc., "Monitoring Voice Quality in Voice Over IP Networks," 3 pages, 2001.

Telchemy, Inc., "Bringing Intelligence ot Networks," http://www.telchemy.com/, pp. 1-5, 2001.

Viola Networks, "NetAlly® VoIP—VoIP Readiness Testing and Deployment," http://www.omegon.com/netally_voip.asp, pp. 1-4, 2002.

Moshe Sidi et al., "Converged Network Performance Verification and e-Support Using NetAlly®," Omegon Networks Ltd., pp. 1-13, Jun. 2001.

Moshe Sidi, "Reality-based VoIP Readiness Testing using NetAlly® VoIP," Viola Networks, pp. 1-10, Apr. 2002.

Moshe Sidi, "Readying Your Network for VoIP: Get it Right the First Time," Viola Networks, pp. 1-9, Apr. 2002.

* cited by examiner

FIG. 3
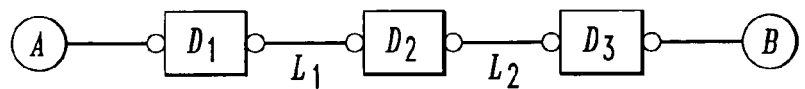
FIG. 4
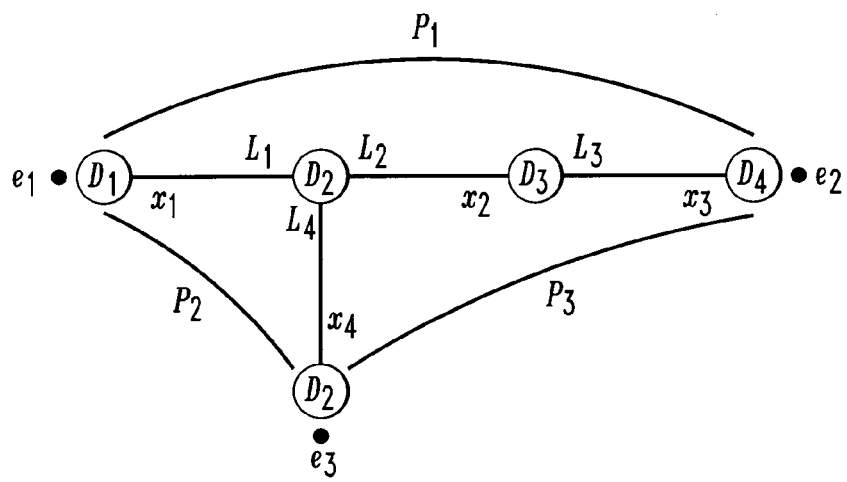
FIG. 5
$$\left[\begin{array}{c|cccc} & L_1 & L_2 & L_3 & L_4 \\ \hline P_1 & 1 & 1 & 1 & 0 \\ P_2 & 1 & 0 & 0 & 1 \end{array}\right]$$
FLOW MATRIX 1
$$\left[\begin{array}{c|cccc} & L_1 & L_2 & L_3 & L_4 \\ \hline P_1 & 1 & 1 & 1 & 0 \\ P_2 & 1 & 0 & 0 & 1 \\ P_3 & 0 & 1 & 1 & 1 \end{array}\right]$$
FLOW MATRIX 2

FIG. 6

EQUATIONS WITH FLOW MATRIX 1

$$x_1 + x_2 + x_3 = y_1$$
$$x_1 + x_4 = y_2$$

$$\begin{bmatrix} 1 & 1 & 1 & 0 \\ 1 & 0 & 0 & 1 \end{bmatrix} \begin{bmatrix} x_1 \\ x_2 \\ x_3 \\ x_4 \end{bmatrix} = \begin{bmatrix} y_1 \\ y_2 \end{bmatrix}$$

EQUATIONS WITH FLOW MATRIX 2

$$x_1 + x_2 + x_3 = y_1$$
$$x_1 + x_4 = y_2$$
$$x_2 + x_3 + x_4 = y_3$$

$$\begin{bmatrix} 1 & 1 & 1 & 0 \\ 1 & 0 & 0 & 1 \\ 0 & 1 & 1 & 1 \end{bmatrix} \begin{bmatrix} x_1 \\ x_2 \\ x_3 \\ x_4 \end{bmatrix} = \begin{bmatrix} y_1 \\ y_2 \\ y_3 \end{bmatrix}$$

FIG. 7

Generate_Pipes($G = (D, L)$: Network Topology Graph, $E$: Set of Leaves)
$I$: Set of pipes in $G$ wrt $E$
$I \leftarrow \emptyset$
Compute $P$ for $G$ wrt $E$
Let $M$ be the complete flow matrix for $G$ and $P$
// *Group links with the same column vector into disjoint sets*
Let $k$ be the number of distinct column vectors in $M$
Form a set $\mathbf{S} = \{S_0, S_1, ..., S_k\}$ where:
    each $S_i$, $0 < i \leq k$ contains links in $L$ with the $i^{th}$ distinct column vector in $M$
// *Ensure that links in each element of S form a path in G*
for $i=1$ to $|\mathbf{S}|$
    if links in $S_i$ are consecutive and form a path
        then merge $S_i$ into path $p$, $I \leftarrow I \cup \{p\}$    // *add the path formed by the links in $S_i$ as a pipe*
    else $I \leftarrow I \cup S_i$    // *add each link as a pipe by itself*
return $I$

*FIG. 8*
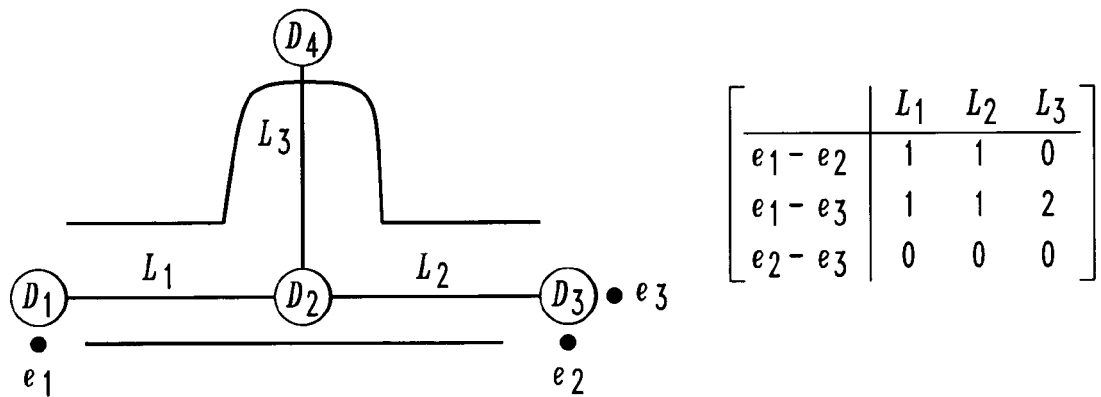
*FIG. 9*
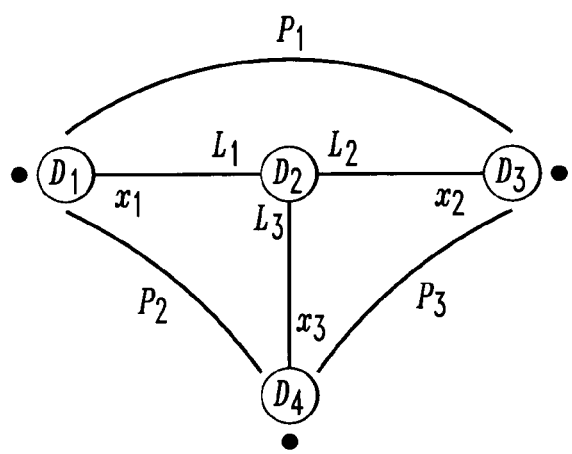
*FIG. 10*
FLOW MATRIX 1          FLOW MATRIX 2
$$\begin{bmatrix} 1 & 1 & 0 \\ 1 & 0 & 1 \end{bmatrix}$$    $$\begin{bmatrix} 1 & 1 & 0 \\ 1 & 0 & 1 \\ 0 & 1 & 1 \end{bmatrix}$$

FIG. 11
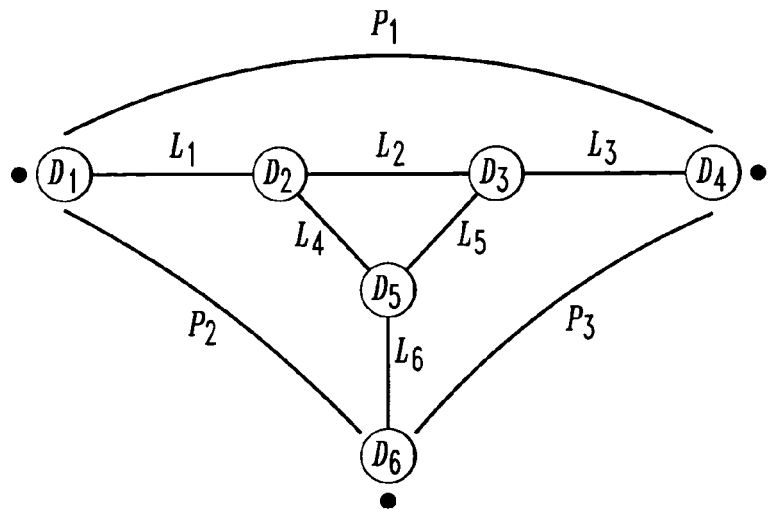
FIG. 12
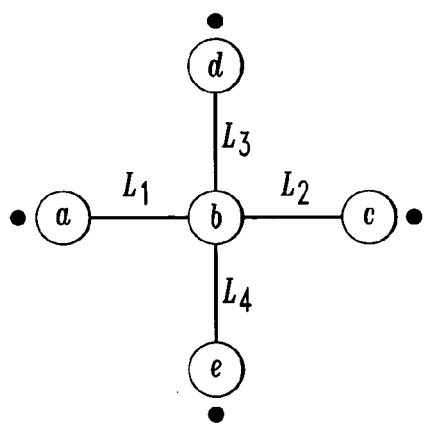
FIG. 13
$$\begin{bmatrix} & L_1 & L_2 & L_3 & L_4 \\ \hline L_1 \cdot L_4 & 1 & 0 & 0 & 1 \\ L_4 \cdot L_2 & 0 & 1 & 0 & 1 \\ L_2 \cdot L_3 & 0 & 1 & 1 & 0 \\ L_3 \cdot L_1 & 1 & 0 & 1 & 0 \end{bmatrix} \quad \begin{bmatrix} & L_1 & L_2 & L_3 & L_4 \\ \hline L_1 \cdot L_2 & 1 & 1 & 0 & 0 \\ L_1 \cdot L_3 & 1 & 0 & 1 & 0 \\ L_1 \cdot L_4 & 1 & 0 & 0 & 1 \\ L_2 \cdot L_3 & 0 & 1 & 1 & 0 \end{bmatrix}$$
$\{L_1 \cdot L_4,\ L_4 \cdot L_2,\ L_2 \cdot L_3,\ L_3 \cdot L_1\}$  $\qquad\qquad$  $\{L_1,\ L_2,\ L_3,\ L_4\}$

FIG. 14

Select_Matrix($G' = (D', I)$:Reduced Network Topology Graph, $E$: Set of Leaves)

$W$: Set of worms in $G'$ wrt $E$, $W \leftarrow \emptyset$
$R$: Set of paths, $R \leftarrow \emptyset$
Compute $P'$ for $G'$ wrt $E$
$open \leftarrow P'$
while $open \neq \emptyset$
  select $p$ from $open$
  for each pipe $c_i$ on $p = c_1 \cdot c_2 \cdot \ldots c_{length(p)}$ if $\exists S \subset open$ such that $S$ makes $c_i$ estimable     ← B1

Compute $S'$ which has the original value of each path in $S$
      $R \leftarrow R \cup S'$
      $W \leftarrow W \cup \{c_i\}$
      update $open$ and $W$ such that $\forall p' \in open$
        $p'$ does not contain any estimable path in $W$     // $c_i$ is removed from paths in $open$
    else
      $c_{i+1} \leftarrow c_i \cdot c_{i+1}$
$open \leftarrow open \setminus \{p\}$
return $W, R$ FIG. 15
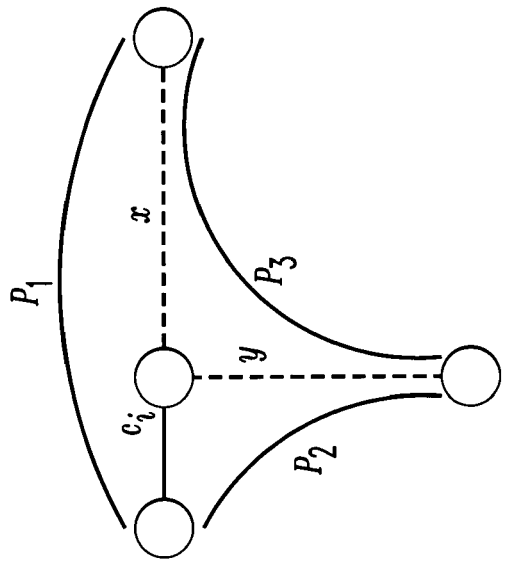
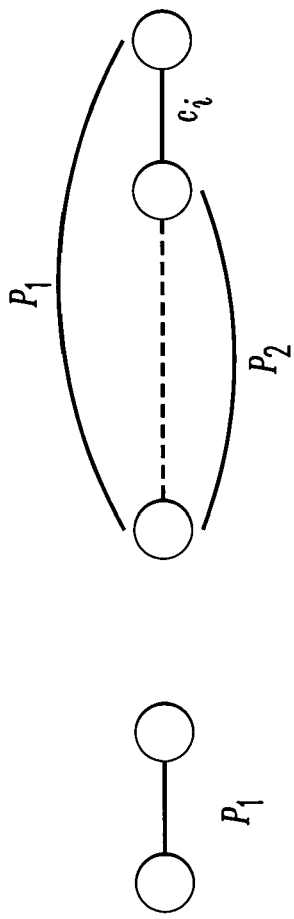
$c_i \cdot x = P_1$
$c_i \cdot y = P_2$
$x \cdot y = P_3$
PATTERN 3
$P_2 \cdot c_i = P_1$
PATTERN 2
$c_i = P_1$
PATTERN 1

FIG. 16

Compute_EstPaths($G' = (D', I)$:Reduced Network Topology Graph, $E$: Set of Leaves, $P'_{t_i}$ : End-to-end paths at time $t_i$)

$M$: A Minimal set of estimable paths for $G'$ wrt $E$, $W \leftarrow \emptyset$
$open \leftarrow P'_{t_i}$
while $open \neq \emptyset$
   while $open$ not converged
      select $p$ from $open$
      for each pipe $c_i$ on $p = c_1 c_2 \ldots c_{length(p)}$ if $\exists S \subset open$ such that $S$ makes $c_i$ estimable $M \leftarrow M \cup \{c_i\}$
            update $open$ and $M$ such that $\forall p' \in open$
            $p'$ does not contain any estimable path in $M$ and
            $open \leftarrow open \setminus \{p\}$       // $c_i$ is removed from paths in $open$
         else
            abort processing of $p$
   if $open \neq \emptyset$
      select shortest $p$ in $open$
      $open \leftarrow open \setminus \{p\}$
      $M \leftarrow M \cup \{p\}$
return $M$

METHOD AND APPARATUS FOR AUTOMATIC DETERMINATION OF PERFORMANCE PROBLEM LOCATIONS IN A NETWORK

RELATED APPLICATION(S)

The present application is related to the following U.S. patent applications: Ser. No. 10/270,011, entitled "Report Generation and Visualization Systems and Methods and Their Use in Testing Frameworks for Determining Suitability of a Network for Target Applications," Ser. No. 10/270,335, entitled "Network Topology Discovery Systems and Methods and Their Use in Testing Frameworks for Determining Suitability of a Network for Target Applications," and Ser. No. 10/270,122, entitled "Network Traffic Generation and Monitoring Systems and Methods for Their Use in Testing Frameworks for Determining Suitability of a Network for Target Applications," all of which were filed on Oct. 15, 2002, the disclosures of which are incorporated by reference herein.

FIELD OF THE INVENTION

The invention relates generally to network monitoring and analysis systems, and more particularly to techniques for the monitoring and analysis of Voice over Internet Protocol (VoIP) communications, multimedia communications or other types of network traffic in a network-based communication system.

BACKGROUND OF THE INVENTION

Recent trends in the telecommunications industry towards unified communications emphasize the need for converged networks to deliver acceptable quality of service (QoS) for different types of applications with varying QoS needs. Multimedia applications such as Internet telephony are among the end-to-end applications which demand strict QoS guarantees from the underlying data network. Understanding the network behavior at all stages of the deployment of such applications is critical for their performance. For example, at the pre-deployment stage, it is necessary to assess whether the network can deliver the required QoS and more importantly which parts of the network fail to do so. After deployment, monitoring the performance of the network is necessary for maintaining acceptable QoS levels.

Conventional network monitoring and analysis systems are generally not configured to provide an adequate mechanism for understanding link-level QoS behavior in a network. Such information is particularly useful for the purpose of locating the sources of performance problems in a network, but is also useful for many other purposes.

Accordingly, a need exists for an improved network monitoring and analysis system which provides information useful for locating the sources of performance problems at a link level, as well as for other purposes.

SUMMARY OF THE INVENTION

The invention addresses the above-noted need by providing techniques for automatically determining the particular locations associated with performance problems in a network of a network-based communication system comprising a plurality of endpoint devices.

In accordance with one aspect of the invention, a network monitoring and analysis system is configured to include a root cause analysis function that permits the automatic determination of performance problem locations in the network. Test communications are generated in accordance with a selected pattern, and end-to-end path measurement data is collected utilizing the generated test communications. The test communications may be directed between pairs of the endpoint devices as specified in the selected pattern. The end-to-end path measurement data is transformed to produce a plurality of performance indicators comprising a performance indicator for each of a plurality of non-end-to-end paths defined at least in part by the selected pattern.

In an illustrative embodiment, the collected end-to-end path measurement data for a given time interval is characterized by the equation:

$$y = Ax$$

where y is a vector of end-to-end path measurements, A is a flow matrix defining the above-noted selected pattern, and x is a vector of network link-level performance indicators. The end-to-end path measurement data is transformed into the plurality of link-level performance indicators in this embodiment by utilizing y and A to solve the equation for x. This process may be repeated for each of a plurality of time intervals.

In accordance with another aspect of the invention, the selected pattern is defined by a flow matrix having rows representing end-to-end paths for which measurement data is collected, and columns representing single-link or multiple-link non-end-to-end paths for which performance indicators are determined. The flow matrix may comprise an n×m matrix wherein for $0 < i \leq n$ and $0 < j \leq m$, $m_{i,j}$ denotes the number of times the end-to-end path in row i traverses the non-end-to-end path in column j.

In accordance with a further aspect of the invention, the selected pattern is determined at least in part based on a reduced network topology generated by applying a network topology reduction process to a graph representative of a topology of the network. The network topology reduction process determines one or more non-end-to-end paths within the network which carry the same traffic flow.

In determining the selected pattern, a flow matrix selection algorithm may be applied to the reduced network topology. The flow matrix selection algorithm preferably maintains a list of end-to-end paths and processes the list such that a plurality of non-end-to-end paths for which performance indicators can be generated is determined. The flow matrix selection algorithm may also be configurable to accept one or more constraints on selection of particular paths in generating a given flow matrix.

Advantageously, the present invention in the illustrative embodiment provides a particularly efficient and accurate mechanism for generating link-level performance indicators in a network-based communication system, thereby permitting a better understanding of QoS behavior in the network.

BRIEF DESCRIPTION OF THE DRAWINGS

FIGS. 3, 4, 8, 9, 11 and 12 show example networks used in illustrating the operation of the invention.

FIG. 5 shows a set of flow matrices for the example network of FIG. 4.

FIG. 6 illustrates the manner in which link-level performance estimates can be generated in the example network of FIG. 4 using the flow matrices of FIG. 5.

FIG. 7 shows a pipe generation algorithm utilized in implementing a network topology reduction in accordance with the invention.

FIG. 10 shows a set of flow matrices for the example network of FIG. 9.

FIG. 13 shows a set of flow matrices for the example network of FIG. 12.

FIG. 14 shows a flow matrix selection algorithm utilized in selecting a flow matrix for a given reduced network topology graph in accordance with the invention.

FIG. 15 illustrates three example patterns for estimating a given pipe in the flow matrix selection algorithm of FIG. 14.

FIG. 16 shows an algorithm for computing estimated paths for a given reduced network topology graph in accordance with the invention.

DETAILED DESCRIPTION OF THE INVENTION

The invention will be illustrated below in conjunction with an exemplary network-based communication system suitable for supporting Internet telephony applications. It should be understood, however, that the invention is not limited to use with any particular type of communication system or configuration of endpoint devices or other system elements. Those skilled in the art will recognize that the disclosed techniques may be used in any communication application in which it is desirable to provide improved monitoring and/or analysis of Internet protocol (IP) communications or other types of real-time or non-real-time network traffic in a network-based communication system.

Moreover, the invention, although particularly well-suited for use in monitoring and analysis of VoIP traffic, also provides significant advantages in multimedia traffic applications or other flow-based real-time applications in which it is desirable to understand link-level performance within the network.

The invention can thus be used with voice, video, multimedia or any other type of network traffic in a network-based communication system.

The term "packet" as used herein is intended to include not only IP packets but also other types of packets used in other packet-based communication systems.

The term "call" as used herein is intended to be construed broadly so as to encompass Internet telephony communications, VoIP communications, Session Initiation Protocol (SIP) communications, multimedia communications, or other types of network traffic in a network-based communication system.

The terms "endpoint" and "endpoint device" are used interchangeably herein and are intended to include an origination or destination device associated with a given VoIP call or other type of communication in a network-based communication system.

It is to be appreciated that a given endpoint device therefore need not be a terminal device of the system, and may comprise an internal network element such as, for example, a gateway, a router, a switch, or any other type of non-terminal network element. A given pair of endpoint devices in the illustrative embodiment may be viewed generally as comprising the source and destination nodes of a particular communication path. An endpoint device may therefore be a device comprising or otherwise associated with any network node.

The term "measurement data" as used herein is intended to include jitter, loss, delay or other QoS-related statistics, associated analysis results determinable therefrom, as well as other types of data.

Figure 1A:
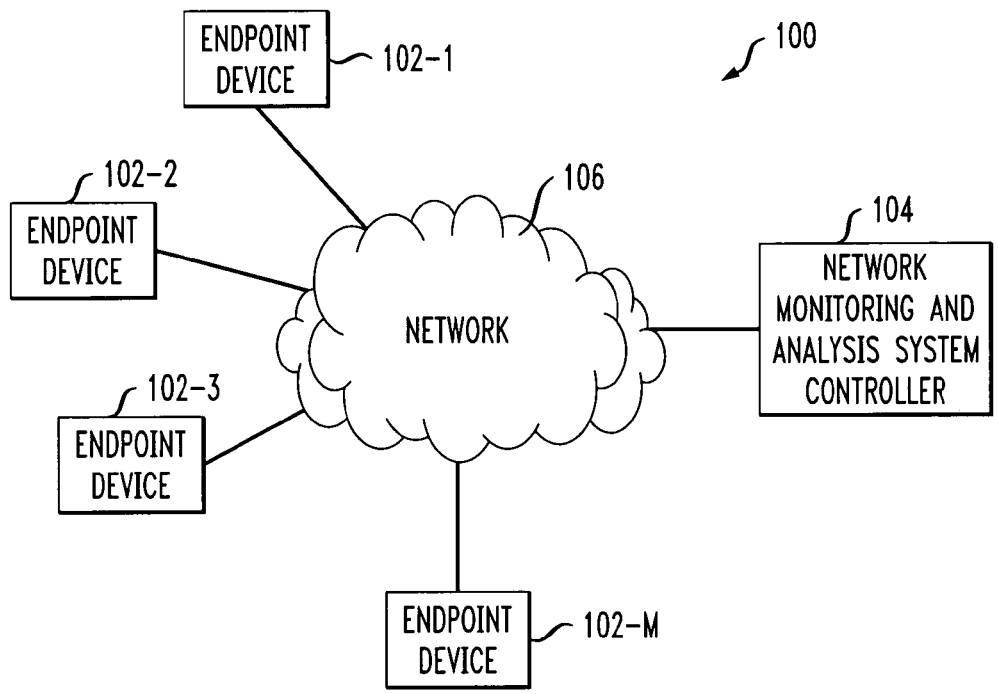
FIG. 1A shows an exemplary communication system in which the invention is implemented.

FIG. 1A shows an example network-based communication system 100 in which the present invention is implemented. The system 100 includes an arbitrary number M of endpoint devices 102-j, j=1, 2, . . . M, and a network monitoring and analysis system controller 104. Each of the endpoint devices 102 and the controller 104 is coupled to or otherwise associated with a network 106. It should be noted that the variables j and M are used in a different sense in the context of FIG. 1A than elsewhere in the description.

Although shown for simplicity of illustration as terminal endpoint devices in the figure, one or more of the endpoint devices of the system, as indicated previously, may comprise or be otherwise associated with an internal node of network 106.

An illustrative embodiment of the invention as implemented in the network-based communication system 100 of FIG. 1A advantageously permits automated determination of the particular location(s) associated with one or more performance problems in the network 106. This function is generally referred to herein as "root cause analysis," and is a type of function that may also be referred to as "blame attribution." The controller 104 may illustratively comprise an otherwise conventional controller of a network monitoring and analysis system, implemented in or otherwise utilized in conjunction with the system 100, suitably modified to include a root cause analysis function in accordance with the invention, as will be described in detail below.

The term "network monitoring and analysis system" as used herein is intended to include a network monitoring system, a network analysis system, or a system capable of both network monitoring and network analysis.

One example of a network monitoring and analysis system that may be configured to include a root cause analysis function in accordance with the invention is the ExpertNet™ network readiness assessment tool commercially available from Avaya Inc. of Basking Ridge, N.J, USA. The ExpertNet™ tool may be configured to collect various measurements from a network, including, by way of example, topology information, periodic traffic measurements from network devices via Simple Network Management Protocol (SNMP), and end-to-end performance measurements collected with the use of software agents installed at various endpoint devices or elsewhere in the network. The conventional aspects of this tool and other network monitoring and analysis systems are well-known in the art, and therefore will not be further described herein. Such systems may be implemented at least in part in the form of software running on a computer or other processing device associated with the controller 104.

Further aspects of network monitoring and analysis systems that may be utilized in conjunction with the invention are described in the above-cited U.S. patent application Ser. Nos. 10/270,011, 10/270,335, and 10/270,122.

Additional details regarding possible network monitoring and analysis system features that may be implemented in the system 100 are described in U.S. patent application Ser. No. 10/261,431, filed Sep. 30, 2002 and entitled "Communication System Endpoint Device With Integrated Call Synthesis Capability," U.S. patent application Ser. No. 10/459,948, filed Jun. 12, 2003 and entitled "Distributed Monitoring and Analysis System for Network Traffic," and U.S. patent application Ser. No. 10/460,700, filed Jun. 12, 2003 and entitled "Method and Apparatus for Determination of Network Topology," the disclosures of which are incorporated by reference herein.

Although system 100 is shown as including a centralized controller 104 in FIG. 1A, this should not be construed as a requirement of the invention. The invention can alternatively be implemented using a distributed monitoring and analysis system as described in the above-cited U.S. patent application Ser. No. 10/459,948, or using a combination of centralized and distributed techniques. In such embodiments, the functions of the controller 104 may be distributed at least in part across one or more of the endpoint devices, and/or associated distributed test units.

The term "controller" as used herein is therefore intended to include a centralized controller, a distributed controller, or a hybrid controller which is at least partially centralized and at least partially distributed.

The endpoint devices 102 may be otherwise conventional wired or wireless IP telephones (including devices commonly referred to as IP "softphones"), personal digital assistants (PDAs), mobile telephones, personal computers (PCs), single-board computers (SBCs) or other types of processing devices, suitably configured for interaction with the controller 104 in providing various functions of the network monitoring and analysis system.

It should be noted that the endpoint devices 102 are each typically configured to operate as both receiver and transmitter, as in the case of a bidirectional VoIP communication established between a given pair of endpoints.

Conventional aspects of such endpoint devices are well-known in the art and therefore not described in further detail herein.

One or more of the endpoint devices 102 may comprise so-called "synthetic" devices which generate test communications in the form of synthesized calls but are not configured for use in placing actual calls. Also, one or more of the endpoint devices may comprise devices suitable for use in placing actual calls and also capable of generating test communications in the form of synthesized calls. Additional details regarding devices of the latter type can be found in the above-cited U.S. patent application Ser. No. 10/261,431.

Additional system elements, not shown in FIG. 1A, may be coupled between each of the endpoints 102 and the network 106, or otherwise arranged within the system 100, in accordance with conventional practice.

Network 106 may represent, e.g., a global communication network such as the Internet, a wide area network, a metropolitan area network, a local area network, a wireless cellular network, a public switched telephone network (PSTN), or a satellite network, as well as portions or combinations of these or other communication networks.

The network 106 may comprise conventional IP routers, gateways, switches or other packet processing elements. For example, the network may include a DEFINITY® Enterprise Communication Service (ECS) communication system switch available from Avaya Inc. of Basking Ridge, N.J., USA. Another example call processing switch suitable for use in conjunction with the present invention is the MultiVantage™ communication system switch, also available from Avaya Inc.

Standard protocols that are commonly utilized in VoIP communications include User Datagram Protocol (UDP), described in Internet Engineering Task Force (IETF) Request for Comments (RFC) 768, "User Datagram Protocol," August 1980, http://www.ietf.org/rfc/rfc768.txt, Real-Time Transport Protocol (RTP), described in IETF RFC 1889, "RTP: A Transport Protocol for Real-Time Applications," http://www.ietf.org/rfc/rfc1889.txt, and RTP Control Protocol (RTCP), described in IETF RFC 3158, "RTP Testing Strategies," August 2001, all of which are hereby incorporated by reference herein.

By way of example, VoIP communications may comprise RTP voice data packets that are sent over an IP network using UDP. More particularly, the RTP packets are encapsulated in UDP packets which are themselves encapsulated in IP packets.

Signaling protocols utilizable in conjunction with VoIP communications to provide functions such as call setup, teardown and dial tone include Session Initiation Protocol (SIP), described in IETF RFC 3261, "SIP: Session Initiation Protocol," June 2002, http://www.ietf.org/rfc/rfc3261.txt, International Telecommunication Union—Telecommunication Standardization Sector (ITU-T) Recommendation H.323, "Packet-based multimedia communication systems," November 2000, and ITU-T Recommendation H.225, "Call signaling protocols and media stream packetization for packet-based multimedia communication systems," November 2000, all of which are incorporated by reference herein.

VoIP communications or other communications in the context of the present invention may be implemented utilizing one or more of the above-cited protocols, or other suitable protocols, as will be readily apparent to those skilled in the art.

It should be emphasized that the simplified configuration of the system 100 as shown in FIG. 1A is for purposes of illustration only, and should not be construed as limiting the invention to any particular arrangement of elements. For example, the system 100 may include additional endpoints, comprising other types and arrangements of routing elements, switching elements or other types of processing elements.

Figure 1B:
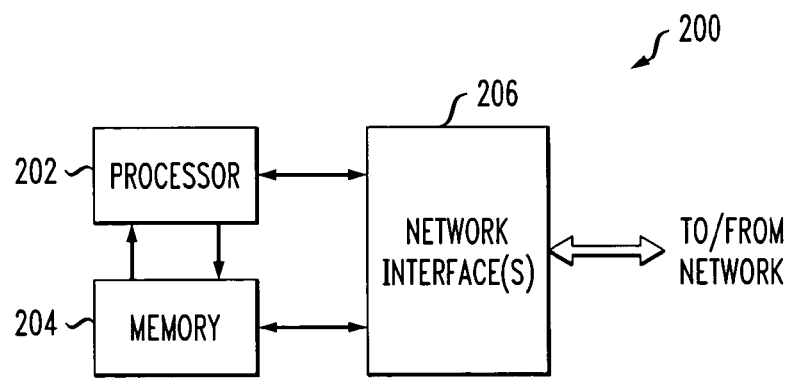
FIG. 1B is a simplified block diagram showing one possible implementation of an endpoint device, controller or other processing element of the FIG. 1A system.

FIG. 1B shows one possible implementation of a given processing element 200 of the FIG. 1A system. The processing element 200 may represent, by way of example, at least a portion of a given one of the endpoint devices 102, at least a portion of the controller 104, or at least a portion of another processing device of the system.

The processing element 200 as shown in the figure includes a processor 202 coupled to a memory 204 and one or more network interfaces 206. The techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as combinations thereof.

Those skilled in the art will recognize that the individual elements of FIG. 1B as shown for illustrative purposes may be combined into or distributed across one or more processing devices, e.g., a microprocessor, an application-specific integrated circuit (ASIC), a computer or other device(s).

The FIG. 1B arrangement is considerably simplified for purposes of illustration. For example, if viewed as representative of a telephony terminal endpoint device, the processing element 200 may include conventional elements typically associated with such a device, such as codecs and other voice signal processing hardware or software elements.

As indicated above, the illustrative embodiment of the invention as implemented in the network-based communication system 100 of FIG. 1A utilizes endpoints 102 and controller 104 to provide a root cause analysis function in a network monitoring and analysis system. The root cause analysis function will now be introduced with reference to FIGS. 2A and 2B. Additional details of the associated processing operations, including a number of examples, will then be described with reference to FIGS. 3 through 16.

Figure 2A:
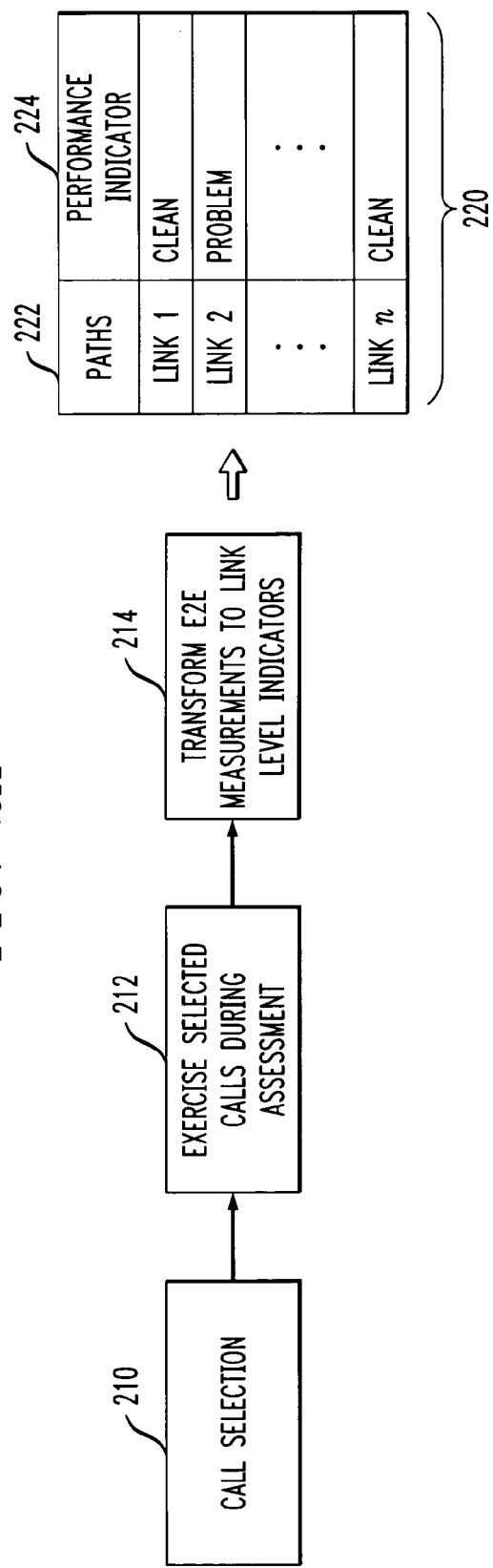
FIGS. 2A and 2B illustrate a root cause analysis function implemented in the system of FIG. 1A in accordance with an illustrative embodiment of the invention.

Referring initially to FIG. 2A, a root cause analysis function in the illustrative embodiment includes a call selection step 210, an assessment step 212, and a transformation step 214, and produces output information 220 that identifies the particular location(s) associated with one or more performance problems in the network 106.

Selection step 210 involves selection of an appropriate set of calls to be placed in the system 100 in conjunction with the root cause analysis function. The selected set of calls is an example of what is more generally referred to herein as a "selected call pattern," or even more generally as a "selected pattern."

In step 212, the selected calls are placed, or "exercised," as part of a network assessment operation of the network monitoring and analysis system, with each call generally being placed between a corresponding pair of endpoint devices 102 of the system 100.

The resulting end-to-end (E2E) measurements, comprising measurement data characterizing the selected calls, are then transformed to link-level indicators in step 214.

The root cause analysis function in the illustrative embodiment yields the output information 220, which includes a set of paths 222 and a corresponding set of performance indicators 224. The set of paths 222 includes an identifier for each of n links, denoted Link 1, Link 2, . . . Link n. The set of performance indicators 224 includes, for each of the links, a corresponding performance indicator. In this example, the performance indicators are binary in nature, taking on one of two values, namely, "Clean" to indicate a link that is not associated with a performance problem, and "Problem" to indicate a link that is associated with a performance problem. More specifically, Link 2 is shown as having the "Problem" indicator, and is thus associated with a performance problem, while Link 1 and Link n are each denoted as "Clean." The indicators may be determined based on a user-defined threshold of acceptable performance, or using other types of thresholding arrangements. The particular thresholds used in a given implementation of the invention are generally dependent upon the application, and can be determined in a straightforward manner, as will be readily apparent to those skilled in the art.

It is to be appreciated that the particular arrangement of processing steps and the output information configuration of FIG. 2A is presented by way of illustrative example only. Numerous alternative arrangements of processing steps and output information configuration may be used in implementing the invention, and the invention is not limited in this regard.

Figure 2B:
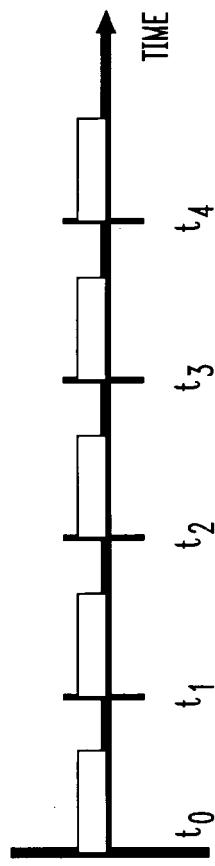

Generally, the root cause analysis function described in conjunction with FIG. 2A involves injecting calls at each of a plurality of times $t_i$, i=1, 2, . . . , with the times preferably being arranged substantially as indicated in FIG. 2B, collecting end-to-end path measurements, and transforming the end-to-end path measurements so as to assign performance indicators to each estimable link.

Further details regarding exemplary implementations of the processing steps 210, 212 and 214 of FIG. 2A will be presented below.

It should be noted that the terms "link" and "path" may each be used herein refer to a communication channel or other connection between network nodes, as in the output information 220 of FIG. 2A. A path may also be generally viewed as comprising a sequence of multiple links. For example, a given end-to-end path between a pair of the endpoints 102 in FIG. 1A may be generally viewed as comprising a sequence of multiple links. In the following description, the term "path" will typically be used in this latter sense, that is, as a sequence of links, while a "link" will be considered a path of unity length. Therefore, in this context, a given link is considered a path, but a given path may not be considered a link.

An important objective in the illustrative embodiment is to assign performance estimates to links or groups of links in the network. In the context of locating the source of performance problems, a single bottleneck link may cause performance problems on any end-to-end path traversing the link. Similarly, a number of bottlenecks can show symptoms throughout the network. The amount of effort required to locate the bottlenecks as well as their scale may be significant depending on the network topology. The illustrative embodiment automates this task by providing a particularly efficient mechanism for understanding the link-level behavior in the network. For example, based on a user-defined threshold of acceptable performance, those links that have unacceptable levels may be identified, and then further investigated to better understand the nature of the problems. This ability to accurately pinpoint the network regions with unacceptable performance levels constitutes an important advantage of the invention.

For the following description, it will be assumed without limitation that the network topology is available and software agents are installed throughout the network that can collect end-to-end performance measurements such as end-to-end delay, jitter, and packet loss. As indicated previously, these features may be provided using the ExpertNet™ tool. Other types of network monitoring and analysis systems may be used.

The approach utilized in the illustrative embodiment begins by analyzing the network topology with respect to the locations of software agents for collecting measurements. We generally attempt to search the network topology for an optimum set of network paths that can be assigned performance estimates. More specifically, an example algorithm is provided below that analyzes the network topology and provides a set of paths to which performance estimates can be assigned. Note that, informally, the optimum set is the one composed of paths that are as short and as disjoint as possible. It can be shown that when the network topology is a tree, this example algorithm determines the optimum set of paths, although the invention can of course be implemented using other algorithms that do not exhibit this property.

Since the approach applied in the illustrative embodiment considers the physical network topology, it is expected that the topology is either a tree or close to being a tree. In cases where an optimum solution is costly, a set of paths may be selected that is a low cost approximation but potentially decreases the accuracy of the approach. Then, we determine where in the network to collect end-to-end path measurements such that we can determine performance estimates for the paths in the selected set. The end-to-end path measurements are then collected, using the above-noted ExpertNet™ tool or other similar system. Finally, the collected data is analyzed in light of the topology in order to infer performance estimates on links or groups of links.

Definitions and notations utilized in describing the illustrative embodiment will now be introduced. It is to be appreciated that these particular definitions and notations are presented for clarity and simplicity of description, and should not be construed as limiting the scope of the invention in any way. Alternative embodiments may therefore be implemented which do not conform to one or more of the definitions and notations given below.

Let $G=(D, L)$ be a connected network topology graph where D is a set of nodes and L is a set of links. Each device in D is a network element such as a router or switch. Let $D_1$ and $D_2$ be two distinct devices in D. There is a link between $D_1$ and $D_2$ if and only if there is a direct communication path between $D_1$ and $D_2$.

A path in G is a sequence of links from L. The length of a path p, denoted as length(p), is the number of links on p. A link is a path of length 1. The symbol $\in$ denotes a path of length 0. For two paths x and y in G, such that the last node of x is the same as the first node of y, x.y denotes the path formed by the concatenation of x and y in G. A path x of G is considered a subpath of another path y in G if there exists a path z such that x.z=y. If $z \neq \in$, then x is a proper subpath of y.

FIG. 3 illustrates an example set of network elements involved in a sample voice call between endpoints A and B. It is assumed that each of these endpoints can initiate and respond to Internet telephony voice calls by generating corresponding RTP streams. Also, the endpoints are assumed to be configured to measure the QoS statistics pertaining to the RTP streams. We refer to the end-to-end traffic between A and B as a flow.

We assume the path from A to B is the reverse of the path from B to A. A line between two devices denotes a bidirectional edge. Assume that the voice packets pass through routers indicated as $D_1$, $D_2$, and $D_3$ in FIG. 3. The router interfaces that the packets traverse are also marked on the figure with circles. For the call shown in FIG. 3, the call path is $L_1.L_2$.

We also assume that the network topology is static and the paths between endpoints do not change over time. Note that this is a reasonable assumption for enterprise networks. Furthermore, as mentioned previously, we assume that the path between two endpoints is the same in both directions.

In the illustrative embodiment, a device in G that has an endpoint attached is referred to as a leaf. Set $E \subset D$ denotes the set of leaves in G. In FIG. 3, $D_1$ and $D_3$ are the leaves.

A path in G that lies between leaves is considered an end-to-end path. In FIG. 3, path $L_1.L_2$ is an end-to-end path.

A set P for a given G and E denotes the set of all end-to-end paths in G between devices in E.

Set P is computed from G and E. Therefore, in the illustrative embodiment, the part of the topology that we can collect measurements from lies between the endpoints, and is defined by the set P.

Matrix notation will be used to represent the network topology and the end-to-end path information. A matrix where rows denote end-to-end paths and columns denote sequences of links (or paths) in G is an example of what is referred to herein as a flow matrix. Let M be an n×m flow matrix. For $0<i \leq n$ and $0<j \leq m$, $m_{i,j}$ denotes the number of times the end-to-end path in row i traverses the path in column j.

A given flow matrix utilizable in accordance with the invention may be a singular matrix or a non-singular matrix. The row and column entries thereof are thus not required to have any particular form.

A flow matrix formed by P and L is considered the complete flow matrix for G and E.

Consider the example network shown in FIG. 4. In this example network there are five network devices, $D=\{D_1, D_2, D_3, D_4, D_5\}$ and four links $L=\{L_1, L_2, L_3 L_4\}$. Leaves $D_1$, $D_4$, and $D_5$ are marked by a black dot next to the device in the figure. The set P is given by $P=\{P_1, P_2, P_3\}$ where $P_1=L_1.L_2.L_3$, $P_2=L_1.L_4$, and $P_3=L_4.L_2.L_3$.

FIG. 5 shows two example flow matrices for the example network of FIG. 4. Flow matrix 1 corresponds to end-to-end paths $P_1$ and $P_2$. Flow matrix 2 corresponds to end-to-end paths $P_1$, $P_2$, and $P_3$.

A call pattern in the illustrative embodiment comprises a list of endpoint pairs. Preferably, measurements are concurrently collected from a given network, pertaining to end-to-end paths between the endpoint pairs in the list.

The call pattern may have other information pertaining to the measurements such as duration, repetition rate and the like. For simplicity of description it will be assumed that exercising a call pattern corresponds to collecting substantially simultaneous performance metrics from the network for a given user-defined duration.

For each flow matrix, a corresponding call pattern can be computed. If there is one endpoint per leaf, then the call pattern for a given flow matrix is unique. If there are two or more endpoints attached to a leaf, then multiple call patterns may match the same flow matrix. In the example network of FIG. 3, call pattern $\{(e_1, e_2), (e_1, e_3)\}$ corresponds to flow matrix 1. Similarly, call pattern $\{(e_1, e_2), (e_1, e_3), (e_2, e_3)\}$ corresponds to flow matrix 2.

Exercising a call pattern generally involves collecting substantially simultaneous measurements from the network. This is preferred in the illustrative embodiment, where it has been assumed that packets traversing distinct end-to-end paths $p_1$ and $p_2$ at a given time receive the same QoS on intersecting segments of $p_1$ and $p_2$.

As noted above, the present invention in the illustrative embodiment collects end-to-end path measurements from the network under consideration at regular time intervals and then uses the measurements to infer link-level performance estimates at each time interval. Measurement collection is implemented by injecting synthetic traffic between endpoints in the network. Note that the time interval length is an adjustable parameter that depends on how frequently one would like to sample the network.

At each time interval, the collected measurements may be viewed as forming the following linear equation:

$$y = Ax$$

where y is a vector of measurements, such as delay, collected on end-to-end paths, A is a flow matrix, and x is a vector of network link-level performance metrics.

In order to determine the x values at each time interval, we solve the above linear equation. Note that the flow matrix A specifies the paths for which performance metrics can be determined. Hence, it is preferable to ensure that the columns of flow matrix A correspond to paths that are as short and as disjoint as possible. Furthermore, A is typically singular.

In order to address the issue of flow matrix size, we take advantage of the simple observation that links carrying the same flow can be treated as one. In the example network of FIG. 4, by recognizing that links $L_2$ and $L_3$ carry the exact same flows and hence can be treated as one unbreakable path, the flow matrices could be reduced by one column. The application of this observation to reducing the network topology will be described in greater detail below.

As mentioned above, the call pattern and the corresponding flow matrix impact the granularity of the link-level estimates. In the example network of FIG. 4, let the average delay incurred on each link at a given time interval be $x_1$, $x_2$, $x_3$, $x_4$ for $L_1$, $L_2$, $L_3$, $L_4$, respectively. Using flow matrix 1, $x_1+x_2+x_3$ and $x_1+x_4$, representing average delay attributable to paths $L_1.L_2.L_3$ and $L_1.L_4$, respectively, can be estimated. Using flow matrix 2, $x_1$, $x_2+x_3$ and $x_4$, representing average delay attributable to paths $L_1$, $L_2.L_3$, and $L_4$, respectively, can be estimated. This determination is illustrated by the equations shown in FIG. 6. As is apparent from the figure, the columns of the flow matrix represent the non-end-to-end paths for which performance estimates can be determined. Such non-end-to-end paths may comprise single-link or multiple-link paths.

In order to estimate performance metrics for each link in the network, it is sufficient to simply exercise a call pattern pertaining to the complete flow matrix. However, this approach would not be scalable since it requires a large call pattern. The two major impacts of such a large call pattern are that each endpoint participates in many concurrent synthetic calls, increasing the load on the endpoints, and the total traffic injected to the network is significant.

The selection of a call pattern and its corresponding flow matrix is therefore an important issue in the illustrative embodiment of the invention. This issue will be addressed in greater detail below. Since the flow matrix determines the call pattern, the call pattern selection process may also be referred to herein as flow matrix selection.

The network topology reduction aspects of the invention will now be described in greater detail.

For a given G and P, a sequence of links is defined as a pipe if each link in the sequence carries the same flow. Set I for a given G and E denotes the set of pipes for a given G and E.

Note that a pipe is a path. We refer to the number of links on a pipe as the length of the pipe.

FIG. 7 shows an algorithm Generate_Pipes that computes the pipe set, I, for a given topology, G and an endpoint set, E. The algorithm starts by constructing P, the set of all end-to-end paths between devices in E. Let M be the complete flow matrix for G with respect to E. The algorithm then groups links in L into disjoint sets such that all links in a given set have the same column vector in M. Let $S=\{S_1, S_2, \ldots S_k\}$ be the result of this grouping, assuming there are k distinct column vectors in M, with sets of sets being denoted in boldface. Note that each element $S_i$ of S is the set of links that carry the same flow. Finally, the algorithm constructs a path for each $S_i$ that corresponds to the concatenation of links in $S_i$. The path for each $S_i$ is added to I. In cases where the topology contains loops, links grouped into a set may not be consecutive to form a path. In such cases, each link is considered a pipe by itself and added individually to I. This could occur if there is a cycle in the topology.

FIG. 8 illustrates a case where there is a loop in the graph. Assume $D_4$ is a router and the rest of the devices in the topology are switches. Assume the path between endpoints $e_1$ and $e_2$ is $L_1.L_2$ and the path between $e_1$ and $e_3$ is $L_1.L_3.L_3.L_2$. Assume endpoints $e_1$ and $e_2$ are on the same virtual local area network (VLAN) and endpoint $e_3$ is on a different VLAN than $e_1$ and $e_2$. Assume $D_4$ is a router that switches between VLANs. The complete flow matrix for this example is also shown in the figure.

The algorithm Generate_Pipes computes $I=\{L_1, L_2, L_3\}$. In this case $L_1$ and $L_2$ carry the same flows even though they are not on the same pipe. The last part of the algorithm Generate_Pipes ensures that links $L_1$ and $L_2$ are not placed in the same pipe even though they have the same column vectors in M as shown in FIG. 9. In this example the reduced topology G' is the same as G since the pipe set I is the same as the link set L.

It should be noted that the case illustrate in FIG. 8 is an example only, and the invention can be implemented using other algorithms which operate in a different manner.

After the computation of pipe set I by the algorithm Generate_Pipes, the reduced network topology is denoted as G'=(D', I) where $D' \subset D$ and there is a pipe in I between each device in D'. Note that E is the same for G and G' since all leaf nodes are included in the reduced topology graph. Furthermore, the topology graph is connected after the reduction. Set P' for a given G' and E denotes the set of all end-to-end paths in G' between devices in E.

The example network of FIG. 4 after the above-described reduction becomes G'=(D', I) where $D'=\{D_1, D_2, D_4, D_5\}$ and $I=\{L_1, L_2.L_3, L_4\}$.

The call pattern selection strategy in the illustrative embodiment will now be described in detail. Call pattern selection in this embodiment generally involves selecting a flow matrix with certain desirable properties. In the following, additive QoS metrics such as delay and loss will be assumed, such that the end-to-end metric corresponds to the sum of individual link-level metrics on the path. A logarithmic model will be used for loss. The foregoing assumption of additive metrics, although it considerably facilitates the processing operations of the illustrative embodiment, should not be construed as a requirement of the invention.

Let $c=L_i \ldots .L_k$ be a path in G=(D, L). The notation v(c) denotes an additive QoS measurement on c, such that $v(c)=v(L_i)+ \ldots +v(L_k)$.

A network path $c=L_i \ldots .L_k$ of G=(D, L) and P is considered estimable if there is a non-singular flow matrix A of end-to-end paths from P and paths in G such that c corresponds to a column in A.

The above definition implies that there exists a flow matrix for any path whose performance can be estimated. Let A be the flow matrix for c. Following from the above definition, if v(c) is a parameter in x and y=Ax is solvable for v(c), then c is estimable.

A set of paths is considered minimal if no path in the set contains another member of the set as a proper subpath.

Consider the example network shown in FIG. 9. In this example there are four network devices, $D=\{D_1, D_2, D_3, D_4\}$, and three links, $L=\{L_1, L_2, L_3\}$. Devices $D_1$, $D_3$, and $D_4$ are each connected to an endpoint as indicated by a black dot next to the device in the figure. The set P is given by $P=\{P_1, P_2, P_3\}$, where $P_1=L_1.L_2$, $P_2=L_1.L_3$, and $P_3=L_2.L_3$.

FIG. 10 shows two example flow matrices for the example network of FIG. 9, namely, flow matrix 1 with paths $P_1$ and $P_2$ and flow matrix 2 with paths $P_1$, $P_2$, and $P_3$.

Using flow matrix 1, the minimal set of estimable paths is $\{L_1.L_2, L_1.L_3\}$. Similarly, using flow matrix 2, the minimal set of estimable paths is $\{L_1, L_2, L_3\}$. Given that it will typically be desirable to estimate QoS parameters such as delay with as fine a granularity as possible, clearly flow matrix 2 is more advantageous.

Set W, for a given G and P, is the minimal set of paths where each member path is estimable and the union of links on all member paths is L.

Note that W for a given G and E is a minimal set. Furthermore, there does not exist a path p in any set of estimable paths for a given G and E, such that p that is a proper subpath of a path in W. For the topology and the leaf set of the example network of FIG. 9, $W=\{L_1, L_2, L_3\}$.

A flow matrix M for G' and E is optimum if the columns of M are formed by the paths in W, and there does not exist a flow matrix M' such that columns of M' are the paths in W and number of rows of M' is less than the number of rows of M.

Note that an optimum flow matrix is non-singular. As indicated previously, the call pattern selection strategy in the illustrative embodiment searches for optimum flow matrices.

Ideally I=W. However, this is not always possible. Consider the example network shown in FIG. 11. In this case, the current location of endpoints allows for three end-to-end paths, $P_1$, $P_2$, and $P_3$. For this example, $W=\{L_1.L_2.L_3, L_1.L_4.L_6, L_3.L_5.L_6\}$, same as the end-to-end paths.

In order to determine an optimum flow matrix for a given G and E, at least |I| end-to-end paths are necessary. This follows from requiring n equations to solve for n unknowns. Note that even in cases where I=W, not any |I| end-to-end paths are sufficient to achieve the optimum flow matrix.

Consider the example network shown in FIG. 12, where |I|=|W|=4, and I=W={$L_1, L_2, L_3, L_4$}. In this case, there are at least two flow matrices that yield two distinct sets of estimable paths. FIG. 13 shows two flow matrices and the minimal set of paths that can be estimated using each flow matrix.

A simple algorithm for flow matrix selection is one which gradually builds a non-singular flow matrix. Let M be a flow matrix constructed by adding rows corresponding to paths in P'. A path p in P' gets selected if adding a new row corresponding to p increases the rank of M. The algorithm stops when all paths are processed. However, an obstacle arises in this algorithm in determining what constitutes the columns in M. One choice is the set of pipes, but in this case the algorithm still has to determine the minimal set of estimable paths for the given topology and endpoint set.

Another issue is that the above-described simple flow matrix selection algorithm may select unnecessary paths since the solution is dependent on the order in which the paths in P' are selected. Many path sets of different sizes may result with the same flow matrix. Similarly, paths sets of the same size may result with different flow matrices as shown in FIG. 13. In the example of FIG. 13, flow matrix 1 requires additional paths to produce the same estimable path set as flow matrix 2.

A further issue pertains to satisfying various constraints in flow matrix selection. The simple algorithm cannot handle cases where there are other constraints on matrix selection such as ensuring that certain pipes in the network are estimable. There is a need to determine if a given path is estimable for a given G' and P'.

FIG. 14 shows an algorithm Select_Matrix that addresses the issues described above. The algorithm provides a heuristic for generating a flow matrix for a given G' and E. W denotes the columns and R denotes the rows in the flow matrix. However, for network topologies where there exists a unique path between each node, the example algorithm of FIG. 14 is guaranteed to produce a flow matrix whose columns are the paths in W for G' and E. Again, it should be understood that the present invention can be implemented using other algorithms which do not produce this particular result.

The example algorithm of FIG. 14 maintains a list of paths, denoted herein as open, which contains paths with no estimable parts. As pipes become estimable during the course of the computation, each path p in open is modified by removing estimable pipes from p. The original end-to-end path for each path in open is maintained.

At the beginning of the FIG. 14 algorithm, P' for input G' and E is computed and open is initialized to P'. At each step, until paths in open are exhausted, the algorithm first removes a path p from open. Then for each pipe $c_i$ on p, it searches open for a set of paths S that can estimate $c_i$. If such a set S is not found, that means $c_i$ is not estimable so $c_i$ is appended to the next pipe on the path. The next pipe processed becomes $c_i.c_{i+1}$. If, however, $c_i$ is estimable by set S, then $c_i$ is added to W. Let S' be the set of original paths pertaining to paths in S. S' is added to R. Then open is updated to reflect the fact that $c_i$ is now estimable. This involves removing $c_i$ from all paths in open. After this operation, open is sorted so that partial paths, i.e., those that have been reduced earlier, are moved to the top and will have preference for processing. When all pipes on p are processed, p is removed from open.

The box labeled as B1 in FIG. 14 denotes the algorithm step where the computation of estimating set S for $c_i$ occurs.

FIG. 15 illustrates three basic patterns for estimating pipe $c_i$. Dashed lines in the figure indicate paths that are in the topology but not immediately relevant to the argument. This step searches the paths in open to determine whether any of the three patterns above apply to paths in open.

In pattern 1, there is a path $P_1$ in open that equals $c_i$. In this case $v(c_i)=v(P_1)$ and S={$P_1$}. $c_i$ can be readily estimated. In pattern 2, $P_1$ and $P_2$ are in open such that $P_2.C_i=P_1$. $v(c_i)=v(P_1)-v(P_2)$ and S={$P_1, P_2$}. The flow matrix where S are the rows and {$P_2, c_i$} are the columns estimates $c_i$. In pattern 3, $P_1$, $P_2$, and $P_3$ are in open where $P_1=c_i.x$, $P_2=c_i.y$, and $P_3=x.y.v(P_1)=v(c_i)+v(x)$, $v(P_2)=v(c_i)+v(y)$, and $v(P_3)=v(x)+v(y)$. In this case $$v(c_i) = \frac{v(P_1) + v(P_2) - v(P_3)}{2}.$$

Hence the flow matrix where S are the rows and {$c_i$, x, y} are the columns estimates $c_i$.

In cases where the network topology has cycles, the algorithm Select_Matrix cannot guarantee that the paths in W for G' and E will be the columns of the selected flow matrix. In these cases, the algorithm provides an approximation. In such cases determination of the optimum solution requires enumerating every possible path in the topology, checking to see if it is estimable, and then taking the minimal set of estimable paths. Clearly this is a costly approach with marginal benefits.

Selection of a call pattern is trivial if there is only one endpoint per leaf and there are no additional constraints. In this case, each end-to-end path corresponding to a row of the flow matrix selected by algorithm Select_Matrix corresponds to a unique endpoint pair. The pairs whose paths correspond to the flow matrix are selected as the call pattern to be used for data collection.

In cases where there are multiple endpoints per leaf, selecting pairs by distributing calls evenly reduces the load on each endpoint. For instance, every time a leaf appears on an end-to-end path, a different endpoint attached to the leaf may be used to inject the synthetic traffic to distribute the load.

In order to satisfy various constraints on call pattern selection, algorithm Select_Matrix may be modified to take into consideration that paths are selectable only if they satisfy the required conditions. This may be accomplished by modifying box B1 in the algorithm Select_Matrix by adding additional constraints. Assume it is required that each endpoint participates in a maximum of N calls at the same time. This implies that an endpoint can appear maximum of N times in the selected call pattern. In this case, additional data structures associated with a path can maintain information about the call pattern. After the selection of each path (e.g., participating in S) these structures are updated to reflect the new addition to the call pattern. Other constraints may be accommodated by modifying the function implemented in box B1. Note that when constraints are imposed on call pattern selection, an optimum flow matrix may not be selected.

Network measurements may be collected by substantially simultaneously injecting synthetic traffic between the endpoints in the selected call pattern. As mentioned previously, data collection occurs at regular, user defined time intervals for a user defined duration. At each time interval $t_i$, synthetic traffic is injected between all endpoint pairs in the call pattern, in a substantially simultaneous manner. It should be understood, however, that this substantially simultaneous injection of traffic is not a requirement of the invention.

Ideally, the same call pattern and hence the same flow matrix is exercised at each time $t_i$. Let $y_i$ be the vector of end-to-end path measurements collected at time $t_i$ and $x_i$ be the vector of network segment parameters, such that $y_i = A x_i$. Since A is the same at each time interval, to obtain x values at each iteration, only different y values need to be substituted.

Empirical studies have shown that not all attempted synthetic calls of the selected call pattern succeed. There can be a number of reasons for a synthetic call to fail, including unfavorable network conditions, problems with endpoint software, etc. In such cases, the equation becomes $y_i = A_i x_i$ where the rows of $A_i$ are a subset of the rows of the selected flow matrix.

In order to address failed calls, one strategy is to assume all failures are due to network congestion and assume infinite delay on all end-to-end paths where a call failed. By substituting infinite delay on y values pertaining to failed calls, we can use the same A matrix at each iteration and the processing becomes simple.

Even though this is a simple solution, it may be misleading since it is unlikely that the failure of calls is always due to network problems. Call failures due to reasons other than network problems may be encountered, for example, when using third-party software in the data collection process. Hence, using the above approach could in some circumstances yield misleading results.

A better solution is to recompute a different $A_i$ at each time ti using the successful calls. Hence at each time interval $t_i$, one may compute a different flow matrix matching the successful calls of call pattern at $t_i$.

FIG. 16 shows an algorithm Compute_EstPaths which computes M, the minimal set of estimable paths from a given set of end-to-end paths, $P'_{t_i}$, in the given topology. Note that the flow matrix for successful calls at time $t_i$ has rows $P'_{t_i}$ and columns as computed by the algorithm Compute_EstPaths.

The algorithm Compute_EstPaths follows the same main outline as algorithm Select_Matrix of FIG. 14 in processing paths in open and ignores parts of the algorithm Select_Matrix that are relevant to end-to-end path selection, such as manipulation of R. The algorithm Compute_EstPaths processes paths until open becomes empty. Processing of a pipe that is found to be estimable is exactly the same as in the algorithm Select_Matrix. Upon encountering a non-estimable pipe c on path p, the algorithm does not give up immediately but simply stops processing p, leaves it in open, and continues processing the next path hoping that when it comes back to p, c is estimable. The algorithm converges if it is unsuccessful in finding any estimable pipe on all paths in open. In that case, if there are any paths remaining in open, the shortest such path is removed from open and added to M. This addresses cases where the sets remaining in open do not constitute a minimal set. Then the algorithm searches for a solution using the updated estimable set.

The difference between the algorithms of FIGS. 14 and 16 in manipulating open is due to an assumption change. The algorithm Select_Matrix of FIG. 14 assumes that if $c_i$ and $c_{i+1}$ are two consecutive pipes on a path, and if $c_i$ is not estimable by itself, then the estimable path that contains $c_i$ also contains $c_{i+1}$. This means that $c_{i+1}$ cannot be estimable in isolation from $c_i$. This assumption does not hold when only a restricted subset of P' is used as is the case for the algorithm Compute_EstPaths of FIG. 16. It is possible that at the time $c_i$ is processed, even though no paths that make $c_i$ are found, paths that make $c_{i+1}$ estimable can be found. Hence the FIG. 16 algorithm does not immediately declare $c_i$ not-estimable but continues searching for estimable pipes on other paths in open.

It should be noted that the call pattern selection strategy of the illustrative embodiment is presented by way of example, and other strategies can be used. For example, a topology analysis based call pattern determined using the techniques above can be combined with a random selection strategy, by applying each of these strategies in alternating time intervals. Of course, numerous other combinations of these and other strategies can be used.

More generally, the invention can be used to transform measurement data collected using any selected call pattern to link-level performance indicators or performance indicators for other types of non-end-to-end paths. For example, the selected pattern may be a random pattern.

A monitoring and analysis system with a root cause analysis function in accordance with the invention can be implemented as part of or in conjunction with an otherwise conventional VoIP analysis tool or other network management system application that is used, for example, to test, diagnose, troubleshoot or design an Internet telephony system or other type of network-based communication system. An example of a network management system application is the VMON® system from Avaya Inc. of Basking Ridge, N.J., USA.

As previously noted, one or more of the monitoring and analysis functions described above in conjunction with the illustrative embodiments of the invention may be implemented in whole or in part in software utilizing processor 202 and memory 204 associated with a controller or an endpoint device. Other suitable arrangements of hardware, firmware or software may be used to implement the techniques of the invention.

It should again be emphasized that the above-described arrangements are illustrative only. For example, alternative embodiments may utilize different endpoint device hardware, firmware or software configurations, different formats for synthesized calls, different types of network traffic, and different communication protocols than those of the illustrative embodiments. In addition, although test communications between a selected pair of endpoints are described in conjunction with the above examples, other arrangements are possible, such as communications with a single endpoint, communications between a given originating endpoint and multiple destination endpoints, etc. Also, the particular processing steps associated with the algorithms in the illustrative embodiment may be varied. Furthermore, the particular assumptions used in the context of describing the illustrative embodiment should not be viewed as requirements of the invention, and embodiments may be constructed in which one or more of these assumptions do not apply. These and numerous other alternative embodiments within the scope of the following claims will be apparent to those skilled in the art.

What is claimed is:

1. A method for determining the location of a performance problem in a network-based communication system comprising a plurality of endpoint devices, the method comprising the steps of:

generating test communications in the system in accordance with a selected pattern;

collecting end-to-end path measurement data utilizing the generated test communications; and transforming the end-to-end path measurement data to produce a plurality of performance indicators comprising a performance indicator for each of a plurality of non-end-to-end paths defined at least in part by the selected pattern;

wherein the selected pattern is determined at least in part utilizing a flow matrix selection algorithm; and wherein the flow matrix selection algorithm maintains a list of end-to-end paths and processes said list such that a plurality of non-end-to-end paths for which performance indicators can be generated are determined.

2. The method of claim 1 wherein a given one of the test communications is directed between a first one of the endpoint devices and a second one of the endpoint devices.

3. A method for determining the location of a performance problem in a network-based communication system comprising a plurality of endpoint devices, the method comprising the steps of:

generating test communications in the system in accordance with a selected pattern;

collecting end-to-end path measurement data utilizing the generated test communications; and transforming the end-to-end path measurement data to produce a plurality of performance indicators comprising a performance indicator for each of a plurality of non-end-to-end paths defined at least in part by the selected pattern;

wherein for a given time interval the collected end-to-end path measurement data is characterized by the equation:

$$y = Ax$$

where y is a vector of end-to-end path measurements, A is a flow matrix defining the selected pattern, and x is a vector of performance indicators.

4. The method of claim 3 wherein the transforming step comprises utilizing y and A to solve the equation for x.

5. The method of claim 1 further comprising repeating the generating, collecting and transforming steps for each of a plurality of time intervals.

6. The method of claim 5 wherein the end-to-end path measurement data corresponding to the one or more test communications generated for an ith time interval $t_i$ is of the form:

$$Y_i = A_i x_i$$

where $y_i$ is a vector of end-to-end path measurements collected for the ith time interval, $A_i$ is a flow matrix defining the selected pattern for the ith time interval, and $x_i$ is a vector of performance indicators for the ith time interval.

7. The method of claim 1 wherein at least one of the performance indicators comprises a binary indicator, the binary indicator taking on a first value to indicate that a corresponding link is not associated with a performance problem, and taking on a second value to indicate that the corresponding link is associated with a performance problem.

8. The method of claim 1 wherein a network of the network-based communication system has a topology characterized by a connected network topology graph G=(D, L) where D is a set of nodes and L is a set of links, and where a given path in G comprises a sequence of links from the set L.

9. The method of claim 8 wherein a node in G having an endpoint device associated therewith is designated as a leaf, and a set $E \subset D$ denotes the set of leaves in G, and further wherein a path in G that lies between leaves comprises an end-to-end path, and a set P for a given G and E denotes the set of all end-to-end paths in G between endpoint devices in E.

10. A method for determining the location of a performance problem in a network-based communication system comprising a plurality of endpoint devices, the method comprising the steps of:

generating test communications in the system in accordance with a selected pattern;

collecting end-to-end path measurement data utilizing the generated test communications; and transforming the end-to-end path measurement data to produce a plurality of performance indicators comprising a performance indicator for each of a plurality of non-end-to-end paths defined at least in part by the selected pattern;

wherein the selected pattern is defined by a flow matrix having rows representing end-to-end paths for which measurement data is collected in the collecting step, and columns representing single-link or multiple-link non-end-to-end paths for which performance indicators are determined in the transforming step.

11. The method of claim 10 wherein the flow matrix comprises an n×m matrix wherein for $0 < i \leq n$ and $0 < j \leq m$, $m_{i,j}$ denotes the number of times the end-to-end path in row i traverses the non-end-to-end path in column j.

12. The method of claim 10 wherein the flow matrix comprises a singular matrix.

13. The method of claim 10 wherein the flow matrix comprises a non-singular matrix.

14. The method of claim 1 wherein the selected pattern is determined at least in part based on a reduced network topology generated by applying a network topology reduction process to a graph representative of a topology of a network of the network-based communication system, the network topology reduction process determining one or more non-end-to-end paths within the network which carry the same traffic flow.

15. A method for determining the location of a performance problem in a network-based communication system comprising a plurality of endpoint devices, the method comprising the steps of:

generating test communications in the system in accordance with a selected pattern;

collecting end-to-end path measurement data utilizing the generated test communications; and transforming the end-to-end path measurement data to produce a plurality of performance indicators comprising a performance indicator for each of a plurality of non-end-to-end paths defined at least in part by the selected pattern;

wherein the selected pattern is determined at least in part utilizing a flow matrix selection algorithm;

wherein the flow matrix selection algorithm is configurable to accept one or more constraints on selection of particular paths in generating a given flow matrix.

16. An apparatus for use in determining the location of a performance problem in a network-based communication system, the system comprising a plurality of endpoint devices, the apparatus comprising:

a controller comprising a processor coupled to a memory; the controller being associated with one or more of the endpoint devices, and being operative to control: (i) generation of test communications in the system in accordance with a selected pattern, (ii) collection of end-to-end path measurement data utilizing the generated test communications, and (iii) transformation of the end-to-end path measurement data to produce a plurality of performance indicators comprising a performance indicator for each of a plurality of non-end-to-end paths defined at least in part by the selected pattern;

wherein the selected pattern is determined at least in part utilizing a flow matrix selection algorithm; and wherein the flow matrix selection algorithm maintains a list of end-to-end paths and processes said list such that a plurality of non-end-to-end paths for which performance indicators can be generated are determined.

17. The apparatus of claim 16 wherein the controller comprises a centralized controller which communicates with the plurality of endpoint devices over a network.

18. The apparatus of claim 16 wherein the controller comprises a distributed controller which is implemented at least in part utilizing one or more of the endpoint devices.

19. An article of manufacture comprising a machine-readable storage medium containing software code for use in determining the location of a performance problem in a network-based communication system comprising a plurality of endpoint devices, wherein the software code when executed implements the steps of:

generating test communications in the system in accordance with a selected pattern;

collecting end-to-end path measurement data utilizing the generated test communications; and transforming the end-to-end path measurement data to produce a plurality of performance indicators comprising a performance indicator for each of a plurality of non-end-to-end paths defined at least in part by the selected pattern;

wherein the selected pattern is determined at least in part utilizing a flow matrix selection algorithm; and wherein the flow matrix selection algorithm maintains a list of end-to-end paths and processes said list such that a plurality of non-end-to-end paths for which performance indicators can be generated are determined.

* * * * *